(12) United States Patent
Diacakis et al.

(10) Patent No.: US 7,231,218 B2
(45) Date of Patent: Jun. 12, 2007

(54) LAWFUL INTERCEPT SERVICE

(75) Inventors: Athanassios Diacakis, Boulder, CO (US); Ioannis Pavlidis, Boulder, CO (US); Paul Joseph Hebert, Longmont, CO (US)

(73) Assignee: Openwave Systems Inc., Redwood City, CA (US)

( * ) Notice: Subject to any disclaimer, the term of this patent is extended or adjusted under 35 U.S.C. 154(b) by 181 days.

(21) Appl. No.: 10/802,323

(22) Filed: Mar. 16, 2004

(65) Prior Publication Data

US 2004/0185875 A1    Sep. 23, 2004

Related U.S. Application Data

(60) Provisional application No. 60/456,656, filed on Mar. 18, 2003.

(51) Int. Cl.
*H04Q 7/20* (2006.01)

(52) U.S. Cl. .............. 455/456.1; 455/456.2; 455/456.3; 455/456.6; 455/457; 455/414.1; 455/414.2; 455/404.1; 455/421

(58) Field of Classification Search ............ 455/456.1, 455/457, 414.1, 414.2, 404.1, 404.2, 421; 379/38
See application file for complete search history.

(56) References Cited

U.S. PATENT DOCUMENTS

| | | | | |
|---|---|---|---|---|
| 5,208,756 A | * | 5/1993 | Song ................ | 455/456.3 |
| 5,218,367 A | | 6/1993 | Sheffer et al. ............ | 342/457 |
| 5,255,306 A | * | 10/1993 | Melton et al. .............. | 379/38 |
| 5,461,390 A | * | 10/1995 | Hoshen ................ | 342/419 |
| 5,577,100 A | | 11/1996 | McGregor et al. ........... | 379/58 |
| 5,721,678 A | | 2/1998 | Widl ............... | 364/424.04 |
| 5,731,757 A | * | 3/1998 | Layson, Jr. .............. | 340/573.1 |
| 5,767,788 A | | 6/1998 | Ness ................... | 340/825.49 |
| 5,774,802 A | | 6/1998 | Tell et al. .................. | 455/408 |
| 5,787,354 A | | 7/1998 | Gray et al. ................ | 455/456 |
| 5,884,221 A | * | 3/1999 | Wortham .................. | 701/300 |
| 6,104,931 A | * | 8/2000 | Havinis et al. .......... | 455/456.5 |
| 6,134,447 A | | 10/2000 | Havinis et al. ............. | 455/456 |
| 6,212,392 B1 | | 4/2001 | Fitch et al. ................ | 455/456 |
| 6,256,504 B1 | | 7/2001 | Tell et al. .................. | 455/456 |
| 6,282,427 B1 | * | 8/2001 | Larsson et al. .......... | 455/456.2 |

(Continued)

FOREIGN PATENT DOCUMENTS

WO    WO 00/04730    1/2000

(Continued)

*Primary Examiner*—Steve M. D'Agosta
(74) *Attorney, Agent, or Firm*—Townsend and Townsend and Crew LLP

(57) ABSTRACT

A system and method is provided for monitoring the activities and/or locations of wireless units in a wireless network independent of location-based service preferences of those wireless units. That is, a system and method is provided that allows an authorized requester override location-based service preferences (e.g., privacy settings) that may be set for a wireless unit. In this regard, an authorized entity may be able to effectively locate and/or monitor the activities of a wireless unit associated with an individual of interest. Furthermore, if proper authorization exists, such monitoring may be done surreptitiously without the wireless unit user's knowledge and/or consent. For example, in some instances, law enforcement agencies may be authorized to monitor call traffic and/or the location of persons utilizing wireless units.

27 Claims, 5 Drawing Sheets

U.S. PATENT DOCUMENTS

| | | | |
|---|---|---|---|
| 6,360,102 B1 * | 3/2002 | Havinis et al. | 455/457 |
| 6,456,852 B2 * | 9/2002 | Bar et al. | 455/456.1 |
| 6,463,288 B1 | 10/2002 | Havinis et al. | 455/456 |
| 6,577,865 B2 * | 6/2003 | Dikmen et al. | 455/433 |
| 2002/0183077 A1 * | 12/2002 | Fomukong | 455/456 |
| 2004/0203879 A1 * | 10/2004 | Gardner et al. | 455/456.1 |

FOREIGN PATENT DOCUMENTS

| | | |
|---|---|---|
| WO | WO 00/27143 | 5/2000 |
| WO | WO 01/26393 A1 | 4/2001 |
| WO | WO 01/33825 A1 | 5/2001 |
| WO | WO 01/35683 A1 | 5/2001 |

* cited by examiner http:// Intercept Server

302 — CLIENT ID: _____

304 — CASE NO.: _____

306 — PASSWORD / AUTHORIZATION CODE: _____

308 — MIN: _____

310 — TRIGGER EVENTS [ ▼ ]

312 — TRACKING AREAS [ ▼ ]

314 — RECIPIENT OF LOCATION INFORMATION: _____

FIG. 2

| | |
|---|---|
| 402 — CLIENT ID | |
| 404 — CLIENT PASSWORD | |
| 406 — CASE NUMBER | |
| 408 — CASE PASSWORD | |
| 410 — STATUS | |
| 412 — MOBILE UNIT ID | |
| 414 — PRIVACY OVERRIDE | |
| 416 — JURISDICTION | |
| 418 — CACHE OPTIONS | |
| 420 — LOCATION NOTIFICATION | |
| 422 — PROVISION NOTIFICATION | |

FIG. 3 ical, the present invention relates to location monitoring of
LAWFUL INTERCEPT SERVICE

CROSS REFERENCE TO RELATED APPLICATIONS

This application claims priority under 35 U.S.C. 119 to U.S. Provisional Application Ser. No. 60/456,656 filed on Mar. 18, 2003, entitled "Lawful Intercept Service," the content of which is incorporated by reference as if set forth in full.

FIELD OF THE INVENTION

The present invention relates in general to location monitoring of wireless communication devices. More specifically, the present invention relates to location monitoring of a wireless communications device irrespective of privacy settings associated with the device and/or without notification of the device. Such functionality may have applications, for example, for law enforcement and homeland security purposes.

BACKGROUND

Wireless communications networks generally allow for voice and/or data communications between wireless units, e.g., wireless telephones (analog, digital, cellular, and PCS), pagers, or data terminals that communicate using RF signals. In recent years, a number of location-finding technologies have been developed that allow for determining the location of such wireless units. These location-finding technologies may utilize any of various location information sources and/or location-finding equipment (LFE) associated with the wireless network.

Due to variations in network environments and location finding technologies, location information for wireless devices is often provided on an application-by-application basis for subscribers of a particular network service application. Moreover, different wireless networks (e.g., CDMA, TDMA, GSM, and iDEN) may require adaptations to the location-based service application and associated interfaces. Accordingly, some applications are specifically adapted for a particular location-finding technology and a particular target network environment. Such location-finding technologies may include, but not be limited to: angle of arrival (AOA), time difference of arrival (TDOA), handset global positioning system (GPS), as well as network architecture (cell/sector). These different technologies involve different location accuracies and formats.

More recently, gateway systems have been developed to alleviate some of the difficulties encountered in positioning wireless units in various network environments. For example, these gateways may provide location information in a format that is independent of the source of the location information, and may provide a standardized interface for requesting and obtaining location information. In this manner, applications can be developed substantially independent of the particular network environment of a serviced subscriber. Accordingly, the location of many wireless units may be obtained from such gateway systems utilizing one or more of the above-listed technologies.

Concurrent with the development of location-based service applications, has been the development of privacy settings for wireless units. In this regard, wireless users may request that no location information be provided to location-based service providers or other entities attempting to obtain the location of the wireless unit. Additionally, systems have been developed to allow wireless units to be notified when location information for that wireless unit is requested. Such privacy settings have increased consumer acceptance of a variety of location-based service applications.

SUMMARY OF THE INVENTION

The ability to monitor the location of a wireless unit free of any privacy settings associated with the wireless unit and/or utilizing one or more location finding technologies across one or more networks may in some instances be desirable. For example, in emergency situations it may be desirable to locate wireless units irrespective of any location-finding preferences of the wireless units and independent of the particular network environments of those units. Likewise, owners of wireless units may desire to monitor the activities of those wireless units independent of preferences of the user of the wireless unit. Moreover, in some instances, law enforcement agencies may be authorized to monitor persons utilizing wireless units. Accordingly, by being able to override location-finding preferences that may be set for wireless units and by being able to locate units in a variety of network environments, an authorized entity may be able to effectively locate and/or monitor the activities of wireless units associated with targeted individuals. Furthermore, if proper authorization exists, such monitoring may be done surreptitiously without the wireless unit user's knowledge and/or consent.

According to a first aspect of the present invention, a method is provided for interfacing a requesting entity with one or more applications operable to provide location information for an identified wireless unit, wherever the location information can be accessed independent of location finding preferences of the user. The method entails establishing an interface for communications between a system operative to procure location information from at least one location information source associated with a wireless network for a wireless unit of interest. The interface defines a standardized form for requesting and providing information. The interface may control communications between the requesting entity and the location provisioning platform, between the platform and a location-based services platform, and/or between the location-based services application and the subscriber wireless units. In this regard, the interface may act as an application program interface that supplies messages to a location information source or gateway application in a standardized form such that a user requesting location information does not have to supply a source-specific location information request. That is, a requestor may provide information in a standardized location request that may be utilized with any of a variety of differently configured location information sources and network environments. Once the interface receives a request for location information for a wireless unit of interest, authorization of the requesting entity to obtain such location information independent of the location finding preferences of the identified wireless unit is verified. Once so verified, location information for the wireless unit of interest is procured utilizing the identified system. This location information may be provided in a standardized output form to the requesting entity or to a third party (e.g., via the interface).

The interface may comprise any platform or processor operative to receive a location information request (e.g., in the standardized format) and access location information from any one or more of a number of wireless location information sources or location gateways associated with the wireless network. In this regard, the interface may be accessed via any suitable user interface such as a graphical user interface, telephonic interface (e.g., utilizing voice activated software and/or computerized prompts), or other input mechanism. In any case, the interface may be configured in a manner that allows a requesting entity to supply one or more fields of information that are subsequently supplied to one or more location information sources. For instance, the interface will typically include fields that allow a requesting entity to identify themselves, a recipient of the location information (e.g., if different than the requesting party) as well as a wireless unit of interest. In the latter regard, such identification may comprise, for example, a mobile identification number (MIN).

The interface may also allow a requesting entity to specify one or more triggering events that will prompt the procurement of location information from one of the sources. Such triggers may be based on wireless unit actions, or, may be independent of wireless units actions or a combination thereof. For example, wireless unit actions that trigger procurement of location information may include, inter alia, sending and/or receiving wireless communications as well as movements of the wireless unit relative to one or more predetermined boundaries or zones. Independent triggers may include procuring location information upon receiving a location request (i.e., ad-hoc), on a periodic basis, or upon a predetermined schedule.

When the procurement of location information is based on the wireless unit's location relative to a zone, boundary or point of interest (hereinafter "zones"), such zones may be identified through the interface. Examples of such zones may include addresses, a point and radius, another wireless unit, as well as geographic boundaries such as, but not limited to, cities, counties, states, and/or legal jurisdictions. In this regard, the interface may be operable to prompt information that enables a requesting entity to define one or more zones.

In addition to requesting entity identification, wireless unit identification, triggering events, and location information routing, the interface may also allow for the requesting entity to supply additional information the may be utilized for procuring the location information. For instance, the requesting entity may provide authorization information indicating the authority of the requesting entity to receive location information for the mobile unit of interest. Such authorization information may allow, inter alia, overriding privacy functions associated with the wireless unit of interest that would otherwise prevent the provision of location information to a requesting entity. Additionally, such authorization may allow a requesting entity to request location information without the wireless unit of interest being notified of the location request and/or procurement of location information. In this regard, a requesting entity may surreptitiously obtain location information and/or monitor the movements of the wireless unit of interest.

Such authorization may be in the form of a code, such as an owner's code, wherein an owner of a wireless unit may retain the authority to identify the location of that wireless unit while the unit is utilized by a third party. This may be applicable in employer-employee applications (e.g., for fleet tracking purposes) in parent-child relationships, as well as for the recovery of lost or stolen wireless units (e.g., tracking stolen vehicles). Such authorization may alternately be legal authorization wherein a requesting person or entity other than an owner of the wireless unit has obtained legal authority (e.g., a court order) to obtain location information for a wireless unit of interest. In the context of legal authority, authorization may entail accessing an official database and/or verifying court documents. In this regard, a legally authorized entity may provide an interface service provider or an official database with appropriate documentation prior to requesting location information. Such legally authorized entities may include law enforcement agencies (LEA) such as local police, probation, and/or federal authorities (e.g., FBI).

According to a second aspect of the present invention, a method is provided for monitoring the location of a wireless unit a wireless network free of any location-finding preferences of the wireless unit and irrespective of that wireless unit passing from a first carrier network to a second carrier network. That is, the method provides a system for aggregating information from separate carrier networks such that monitoring may be effectuated over an enhanced area with improved inclusiveness of subscribers of different carriers, and/or with an enhanced accuracy. The method includes providing a system in communication with a first wireless carrier network having a first subscriber set and a second carrier network having a second subscriber set, wherein the system is operative to provide location information for each of the carrier networks. A location information inquiry for a wireless unit of interest may be received and location information may then be procured irrespective of the carrier network currently servicing the wireless unit and provided to a location associated with the request. As will be appreciated, the location request may include, in addition to wireless unit of interest information, specifications regarding the desired location information, for example, indicating how recent or how accurate the information should be.

The first and second carrier networks may employ different location finding technologies, e.g., GPS, AOA, TDOA, and cell/sector technologies. In this regard, a location request from the requesting entity may result in prompting one or more different location information sources to obtain the location information. If multiple location information sources are available to make a location determination regarding a wireless station the method may include receiving a first location input from a first location information source and receiving a second location input from a second location information source. Furthermore, this first and second information may be combined to provide combined location information having an enhanced accuracy.

According to another aspect of the present invention, a method for obtaining location information of a wireless unit free of any location finding preferences is provided wherein a requesting entity may define one or more events that will trigger the procurement of such location information. The method includes the steps of accessing a system operative to provide location information for wireless units within a wireless network. A requesting entity may then identify a wireless unit and define at least one event that will result in the providing of location information for a wireless unit of interest wherein the location information is provided independent of any location finding preferences of the wireless unit of interest. Upon the occurrence of the defined event(s), location information of the wireless unit of interest may be received.

The present aspect allows a requesting entity to be updated with regard to the location of a wireless unit of interest. In this regard, the location updates may be provided based on trigger events that are wireless unit initiated (e.g., wireless communications to an from the wireless unit) as well as trigger events that are free of wireless unit actions (e.g., scheduled location updates). For instance, location updates may be procured for a wireless unit of interest on a periodic schedule for a predetermined portion of the day (working hours) to verify, for example, that the user of the wireless unit (e.g., an employee) is located within a predetermined area.

According to another aspect of the present invention, a method for obtaining location information for a wireless unit of interest based on the location of that wireless unit relative to one or more zones is provided. The method includes identifying a wireless unit of interest and establishing at least one zone of interest associated with that wireless unit. Location information for the wireless unit is obtained from at least one location information source associated with the wireless network. This may be performed on a period basis or on another schedule based on the location of the wireless unit of interest relative to the zone of interest. In any case, the location information is utilized to monitor a location of the wireless unit relative to the zone of interest. Upon the uncertainty of the location of the wireless unit of interest overlapping with one of the zones of interest, a third party may be notified. Likewise, when an uncertainty associated with the area of the wireless unit overlaps one or more zones of interest, a second monitoring schedule may be implemented: For instance, the rate and/or accuracy of the location monitoring may be increased.

As will be appreciated, the present aspect has numerous law enforcement and/or homeland security applications. In this regard, one or more locations of interest such as, for instance, airports may be defined. Such zones of interest may be global zones of interest applicable to a wide number of wireless units of interest. In this regard, all wireless units associated with a list of suspects (e.g., suspected terrorists) may be monitored relative to the global zones of interest. In this case, if any of the monitored wireless units were to approach within a predetermined distance of the zone of interest, a third party may be notified of the encroachment. For example, a law enforcement agent closest to the encroaching wireless unit may be notified.

BRIEF DESCRIPTION OF THE DRAWINGS

FIG. 2 is a graphical user interface that may be utilized with the present invention;

FIG. 3 is a user profile that may be utilized with the present invention; and

DETAILED DESCRIPTION

The invention described below allows for procuring location information for a wireless unit without necessarily obtaining the permission of a user of the wireless unit. That is, a method is provided for overriding user preferences such that surreptitious monitoring of wireless units may be conducted. As will be appreciated, such monitoring is particularly well suited for law enforcement operations. In this regard, a wireless unit may be monitored or tracked relative to one or more predetermined zones or boundaries. This may allow for, inter alia, improved enforcement of restraining orders, terrorist suspect tracking, and otherwise monitoring the position or movement of assets of interest. Of course, in some instances the surreptitious monitoring may require official authorization (e.g., court order) due to privacy issues. However, it will be noted that the system described herein is not limited to law enforcement activities. For example, certain aspects may be applicable to monitoring employees and/or parental monitoring of minor children (e.g., situations where consent or implied consent is present).

Figure 1:
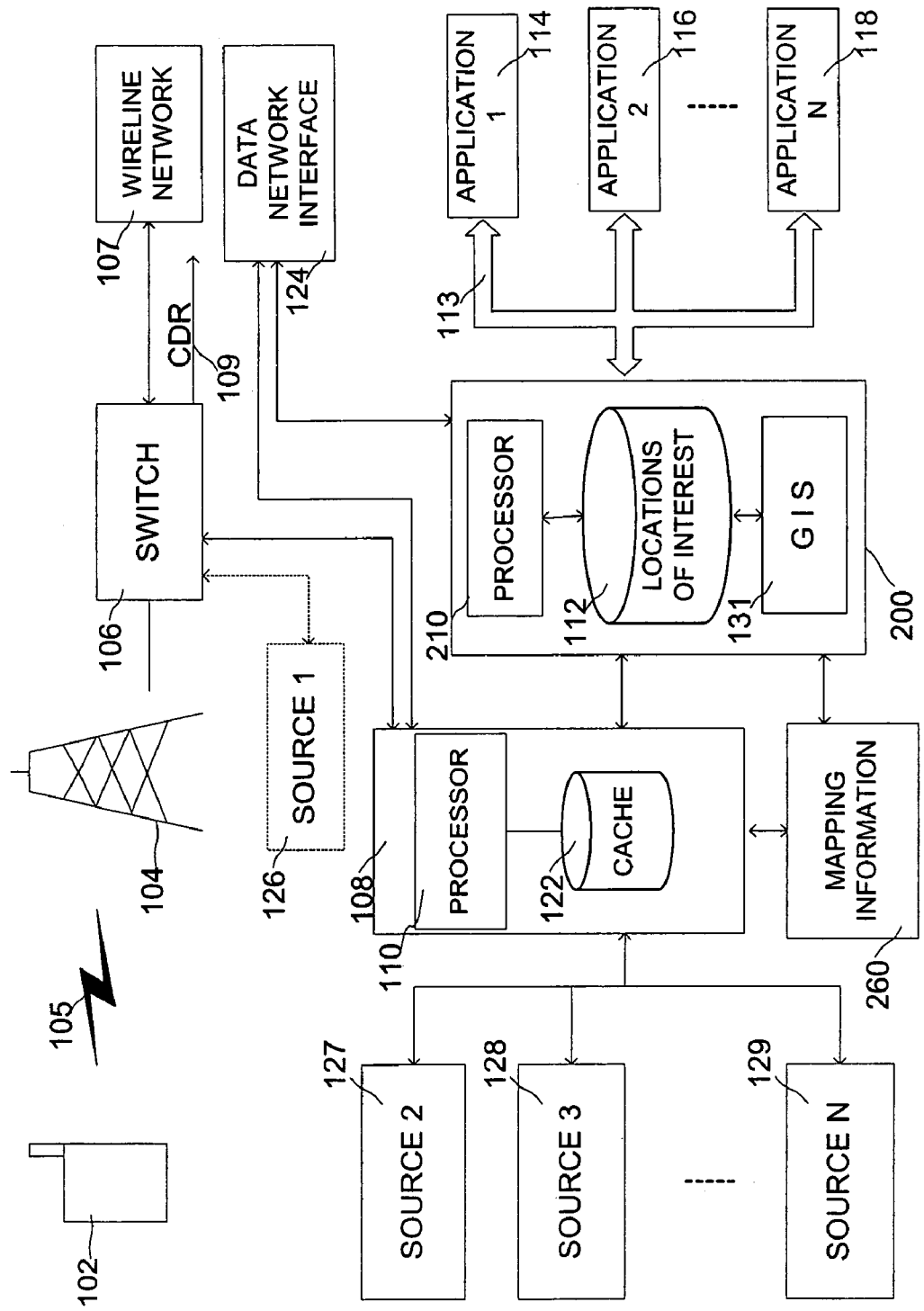
FIG. 1 is a schematic diagram of a network implementing the present invention.

FIG. 1 illustrates a wireless network 100 implementing the present invention. In the network 100, a wireless unit of interest 102 communicates with cell site equipment 104 via an RF interface 105. In the illustrated example, the wireless unit 102 is shown as being a wireless telephone. It will be appreciated, however, that any suitable wireless unit can be utilized including, for example, personal digital assistants, data terminals having a wireless modem, etc. The cell site equipment 104 may be, for example, a cell sector antenna or the like. In the illustrated network 100, the cell site equipment 104 is interconnected to a switch 106. Although only one piece of cell site equipment 104 is illustrated, it will be appreciated that switch 106 may service multiple cells. The switch 106 may include, for example, a home location register (HLR) for a wireless unit of interest 102, a mobile switching center (MSC), Service Control Point (SCP) or any other structure for routing communications between a calling unit and a called unit. Among other things, the switch 106 is operative for routing calls between the wireless network 100 and a wireline network 107 (e.g. an SS7 and/or PSTN network) for communications between the wireless unit 102 and another mobile unit, a wireline unit or a data network node.

FIG. 1 also shows a location manager or gateway 108, illustrated in connection with the switch 106. It will be appreciated that such a gateway 108 may be associated with one or more (typically numerous) switches. Moreover, different gateways may service different subscribers, carriers, applications, equipment, network areas, etc. The gateway 108 may be, for example, a computer platform for executing a variety wireless network applications. The gateway 108 may be physically located proximate to the switch 106 or may be remotely located and interconnected to the switch 106 by a local area network, wide area network or other communications pathway. The illustrated gateway 108 includes a processor 110 for running source selection and location provisioning applications.

In order to implement the lawful intercept service, the gateway 108 communicates with an intercept server 200, as will be more fully discussed below. To provide requested location information, applications running on processor 110 at the gateway 108 are operative to obtain location information from multiple sources 126–129 associated with the network 100. As shown, these sources may be connected to the gateway 108 via the switch or independent of the switch. These sources may employ any of a variety of location finding technologies including AOA, TDOA such as GPS and cell/sector technologies. It will be appreciated that the nature of the data obtained from the sources 126–129 as well as the path by which the data is transmitted varies depending on the type of source and that the ability to accommodate a variety of sources is an important aspect of the present invention. Some types of sources include equipment in the handset. Examples include certain GPS and other TDOA systems. In such cases, location information may be encoded into signals transmitted from the handset to a cell site or other receiver, and the information may then be transferred to the gateway 108 via the switch 106 or otherwise. Other sources, e.g., network-based systems, use equipment associated with individual cell sites such as specialized antennae to make location determinations such as by triangulation and, again, the resulting location information may be transferred to the gateway 108 via the switch 106 or otherwise. Still other sources employ a network of dedicated source equipment that is overlaid relative to the wireless network 100. Such systems may communicate location information to the gateway 108 independent of the switch 106 and network cell site equipment. In addition, some source technologies can be implemented via equipment resident in the handset, in cell sites or other network locations and/or in dedicated sites such that the data pathway of the location information may vary even for a given source technology.

Although a number of the illustrated sources 126–129 are shown as operating separate from the switch 106, in reality, certain ones of the sources, such as a cell ID source, would likely provide information via the switch 106. The sources may further include network-based AOA systems and network-based TDOA systems and external systems such as GPS. Generally, the illustrated network based systems such as AOA and network TDOA systems determine the location of a wireless unit 102 based on communications between the wireless unit 102 and the cell site equipment of multiple cell sites. For example, such systems may receive information concerning a directional bearing of the wireless unit 102 or a distance of the wireless unit 102 relative to each of multiple cell sites. Based on such information, the location of the unit 102 can be determined by triangulation or similar geometric/mathemate techniques. External systems such as GPS systems, determine the wireless station location relative to an external system. In the case of GPS systems, the wireless station 102 is typically provided with a GPS receiver for determining geographic position relative to the GPS satellite constellation or forwarding satellite based information to a network element that computes location. Thus, various types of location information may be transmitted across an air interface to the network 100. Additionally, in the case of network assisted GPS or A-GPS, certain GPS information may be combined with network information to compute the location of a wireless unit.

As shown, the gateway 108 receives location information from the various sources 126–129. Generally, such information is processed by source selection and location provisioning applications supported by the gateway 108 to provide location outputs for use by authorized users of the lawful intercept server 200. Location information may be stored in a cache 122 at the gateway 108 for subsequent retrieval. In this regard, the location cache 122 may include location information for wireless units at various times indexed, for example, to a mobile unit identifier such as a MIN/ESN.

The intercept server 200 may communicate with the gateway 108 over any appropriate communications link. The intercept server 200 may be, for example, a computer platform for executing a variety of intercept-related functions. Such functions may include providing a secure platform that allows access only to authorized users. The intercept server 200 may be physically located proximate to the gateway 108 or may be remotely located. Alternatively, the intercept server 200 may be incorporated onto the same platform as the gateway 108. What is important is that the intercept server provides an interface for client applications 114, 116 and 118 such as law enforcement agencies (LEAs) or otherwise authorized users, to access the location provisioning applications of the gateway 108 and obtain location information for a wireless unit of interest. As will be appreciated, for many law enforcement related tracking purposes, the obtainment of location information for a wireless unit of interest 102 may be done without the knowledge or permission of the user of the mobile unit. In this regard, some sort of official authorization (e.g., a court order) may be required before location information is provided for a mobile unit of interest 102. Furthermore, even if official authorization is obtained, such authorization may be limited in scope. For example, a court order may limit a law enforcement agency 114–118 to tracking a person of interest within a limited geographic boundary (e.g., a state, county, city). Accordingly, an application running on processor 210 within the intercept server 200 allows for validating official authorization as well as defining tracking zones for a wireless unit of interest 102 in which an authorized requesting LEA 114–118 may obtain location information.

In the illustrated embodiment, authorized areas or tracking zones for a wireless unit of interest 102 are stored at the intercept server 200. The tracking zone information 112 stores definitions of locations of interest for use by the LEA applications 114, 116 and 118. The definitions of these locations of interest may be provided in any suitable form. For example, an application for identifying when a wireless unit 102 crosses restricted a boundary may define boundaries in terms of cell identifiers and/or cell sector identifiers. Alternatively, the tracking zone information may be stored as a set of geographical coordinates or geographical boundaries that define a given zone. For cell sector implementations, such geographical information may be converted into current network topology, e.g., cell sector identifiers, at the time of a location comparison. It will be appreciated that other conventions may be utilized for storing a representation of a tracking zone area.

In addition, it will be appreciated that a GIS system 131 may be utilized for inputting and/or formatting the tracking zone information. For example, a service provider or other person defining a tracking zone may wish to input tracking zone boundaries relative to an address, streets, county lines, statelines, or other topological information. A GIS application, such as the MAPS application marketed by Openwave Systems, Inc. of Redwood City, Calif. may be utilized to receive such inputs and convert the associated tracking zone definitions into geographical information formatted for convenient handling by, for example, a boundary crossing application. Thus, tracking zone definitions may be converted from one topological system, e.g., addresses or street boundaries, to another topological system, e.g., geographical coordinates or cell/cell sector identifiers. In any case, the definition of the location of interest as well as the location of a mobile unit may be expressed in terms of a quadtree data structure as described in U.S. Pat. No. 6,212,392, entitled "Method for Determining if the Location of a Wireless Communication Device is Within a Specified Area," which is incorporated herein by reference.

Depending on the specific LEA application 114–118 and other factors, procured location information can be transmitted to different recipients via different pathways. For example, in the case of a restraining order violation, where a wireless unit of interest 102 has entered a restricted zone, a notice of the violation and or the current location of the wireless unit of interest 102 may be provided to a mobile terminal located near the area (e.g., a police car). In this regard, the location information may be provided to locations remote from the requesting LEA application 114–118. For example, such information may be transmitted from the illustrated gateway 108 and/or intercept server 200 to a data network interface 124 for transmission across a data network such as the Internet. Thus, the information may be packetized for transmission across the Internet in accordance with IP protocols. Data may also be transmitted to a recipient utilizing proxies, a microbrowser and other elements for executing a wireless data communications protocol. Similarly, in the case of a CDR output, the CDR may be populated in accordance with telecommunications network protocols.

When location information is provided over a data network, such information may include mapping information. In this regard, the location of the mobile unit of interest may be superimposed on mapping information for receipt by a graphical display. To facilitate such functionality, the intercept server 200 and/or the gateway may be operatively interconnected to a mapping application 260. Such a mapping application 260 may include an archive of mapping information in a form that may be readily incorporated into location information packages for transfer to desired recipients.

Furthermore, the tracking information may be presented in various forms. For example, information may be transmitted to a desired recipient via a short messaging system via a data channel or via an audio channel for providing an audio message that can be played on the unit 102. Likewise, a text message may be displayed on a LCD display or other display of the mobile unit 102.

The LEA applications 114, 116 and 118 may run on the intercept server 200 or on other platforms. In any case, communications between the LEA applications 114, 116 and 118 intercept server 200 and thereby the source selection and location provisioning applications of the gateway 108 may be handled via wireless location interface (WLI) 113. This interface preferably provides a standardized form, message sets and data fields for transmitting/receiving location and tracking requests and receiving/transmitting location information as described in U.S. Pat. No. 6,321,092 entitled "Multiple Input Data Management for Wireless Location-Based Applications," which is incorporated herein by reference. Such an interface advantageously allows LEA applications 114, 116 and 118 to operate without compatibility concerns regarding network environment and the nature of the location sources 126–129.

The WLI 113 allows the LEA applications 114–118, via the intercept server 200, to selectively access information stored in the cache 122 at the gateway 108 and/or prompt one or more of the sources 126–129 to initiate a location determination. As noted, the WLI 113 provides a standard format for submitting location requests to the gateway 108 and for receiving responses from the gateway 108 independent of the location finding technology(ies) employed. In this manner, the applications 114–118 can make use of the best or most appropriate location information available originating from any available sources 126–129 without concern for source dependent data formats or compatibility issues. Moreover, new location finding technologies can be readily incorporated into the system 100 and used by the applications 114–118 without significant accommodations.

The WLI 113 of the illustrated implementation allows the LEA applications 114–118 to include specifications with location and tracking requests for a wireless unit of interest 102. For example, these specifications may include one or more triggering events that dictate when location information for a wireless unit of interest 102 is procured. Such triggering events may include, without limitation: periodic determinations, ad hoc (i.e., one time requests), upon the wireless unit 102 nearing a predetermined border, zone or another wireless unit, upon the wireless unit 102 making or receiving a wireless communication (e.g., phone calls). Furthermore, such specification may include any of the following: the timeliness of the location information (e.g., not older than [date stamp parameter]), the accuracy of the information (e.g., uncertainty not exceeding [uncertainty parameters]), confidence (confidence at least equal to [confidence parameter]). Alternatively, the request may specify the use of the most recent available information, most accurate available information, etc. In addition, the location request can specify whether the gateway 108 should wait for the next available update or force a location determination, whether redundant or unnecessary updates should be filtered (e.g., do not send updates more often than once a minute or if wireless unit has moved less than 50 meters), and what the priority of the request is. In this manner, ongoing monitoring may be employed, for example, by applications such as vehicle tracking and 911.

In one embodiment, the WLI 113 provides a graphical user interface to the LEA applications 114–118 such that users may select from a set of predetermined options. See FIG. 2. For example, a window 300 having one or more user entry fields 302–306 allows a user to provide their identity 302, case number 304, and an authorization code 306. As will be appreciated, in cases where a court order is required, such an order may be provided to an intercept server service provider who in turn may verify the authenticity of the court order and provide the requesting LEA the authorization code. Alternatively, the intercept server 200 may be configured to access an official database (e.g. via the data network interface 124) in order to verify official authorization such as court orders. A wireless unit identification field 308 may also be provided for identification of, for example, MIN/MSISDN, etc. The window 300 also includes pull down menus that allow a user to select trigger events 310 and select tracking areas of interest 312. The trigger events 310 may include, for example, any of those discussed above. The area of interest menu 310 may provide a user with the ability to select and/or specify states, counties, cities, zip codes, a specific address, a point and radius, a boundary etc. In this regard, once a user makes an initial selection, additional menus may be provided to fully identify an area of interest. The window 300 may also include a recipient field 314 that will allow a user to specify where tracking information is to be provided. Such a recipient could be identified using e-mail addresses, a telephone numbers (e.g., for SMS and/or voice messages), IM addresses, IP addresses etc. Alternatively, such information may be provided through the requesting window 300. When the intercept server 200 receives tracking requests from the WLI 113, the processor 210 may compare the request with a stored client profile to ensure that the requesting user is currently authorized to obtain the requested tracking information.

Disclosed in FIG. 3 is a standardized profile 400 for use with the WLI which includes information employed during the authorization and authentication process for client application. In this embodiment, the standardized profile 400 may be entered or modified in a manner other than that described in FIG. 3 (e.g., telephonically, etc.). In some instances, a client application may access and modify portions of the profile 400. The client ID 402 is a unique identifier for a LEA and the case ID 406 is a unique identifier for each of the client's active cases. Each client who employs the system described herein may employ multiple case ID's 406 for which location information may be requested. The client ID 402 and the case ID 406 may be employed in conjunction with authorization codes or passwords 404, 408, respectively, when a client application logs into the system. In this regard, a client may restrict access to a particular case to a particular set of that client's employees.

Status 410 may indicate whether the particular case is active or inactive. In this regard, status 410 may indicate if a court order is still valid such that a client may continue monitoring a mobile unit of interest 102. Only active cases may be allowed to make location requests to the gateway platform 108. The mobile unit ID 412 of the client application profile 400 provides an identifier for a mobile unit of interest 102. Such an identifier may include: MIN/MSISDN etc.

The privacy override 414 allows overriding a privacy setting on a wireless unit 102. In this regard, if a mobile unit 102 enables its user to specify that no location-based applications be allowed to obtain location information for the unit 102, the privacy override allows procuring location information irrespective of this mobile user request. The jurisdiction 416 entry provides information in a form (e.g. quad-tree structure) that delineates one or more authorized tracking zones and/or boundaries. This entry may be linked to additional records.

The cache option 418 provides an indication of the maximum age of the location information stored in a cache that may be provided to the client application. The location notification entry 420 identifies the type of notification a client may receive when location information is procured (i.e. textual, audio, etc.). Finally the provision notification entry 422 provides an indication of the where notification will be delivered.

Figure 4A:
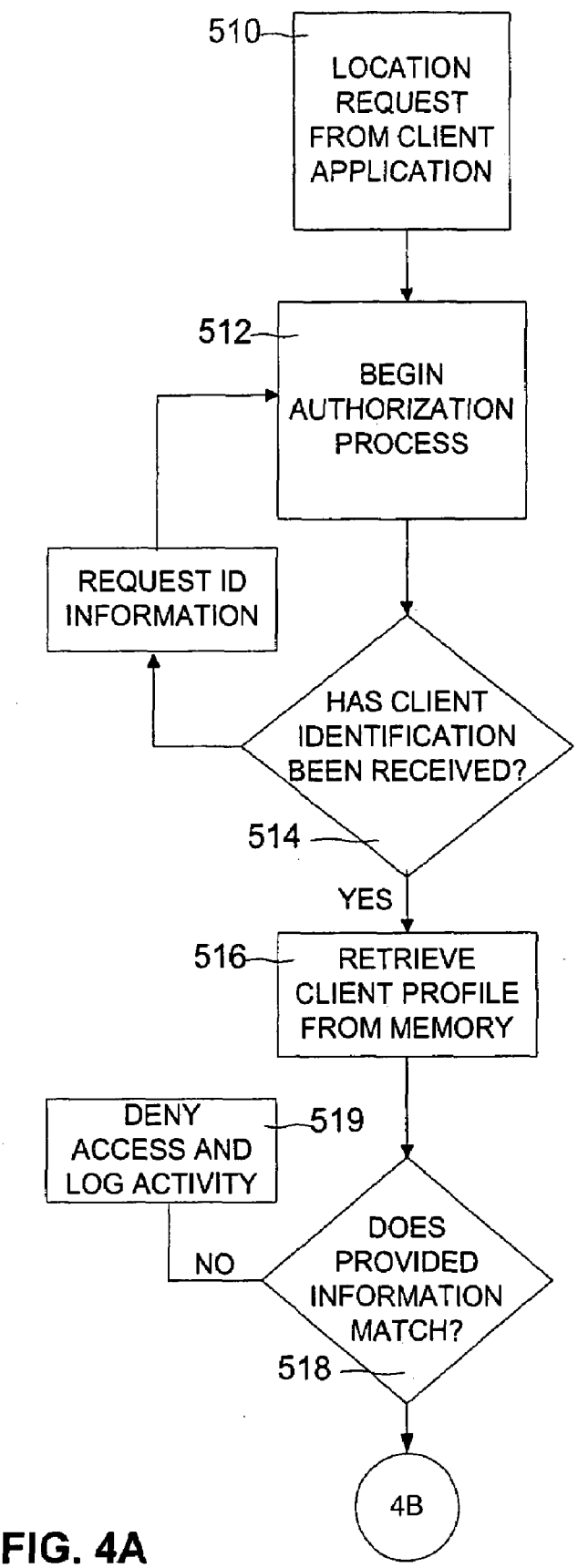
FIGS. 4a and 4b provide a process flow sheet of one embodiment of the present invention.
Figure 4B:
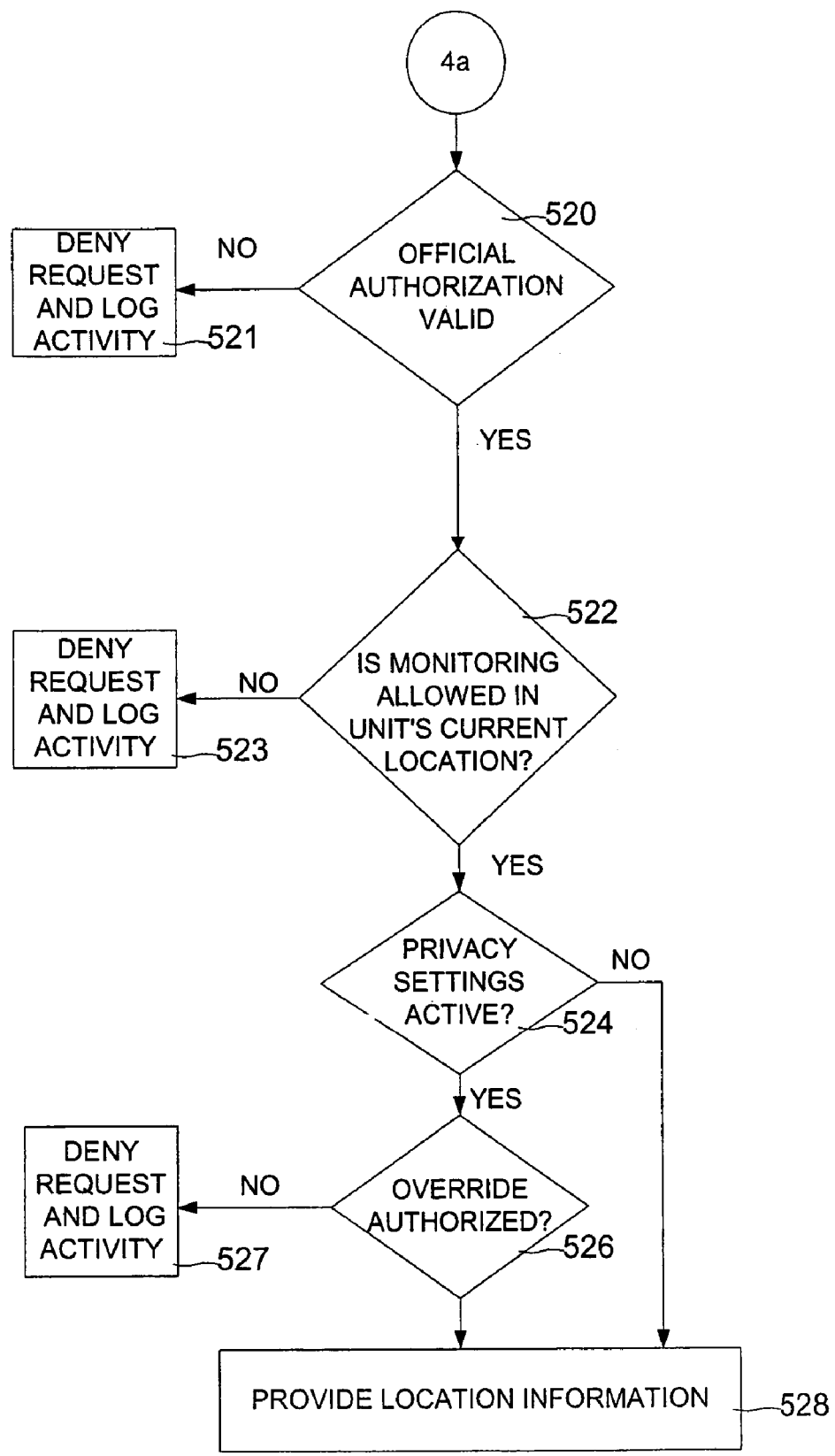

The first step performed when an LEA application 114–118 makes a location information request is the authentication and authorization of that particular application. Disclosed in FIG. 4 is a flow chart which describes in detail the steps performed when authenticating and authorizing an application. Initially, the LEA application 114–118 will access the intercept server 200 either through the WLI 113 or alternatively though a data network interface 124. Once the location request is received (510) from the LEA application 114–118, authentication and authorization (512) begin. As an initial step, a query may be made as to whether the client identification number, case number and/or corresponding passwords have been received (514). When received, the intercept server 200 will search for the corresponding client application profile 400 in memory.

Once the client application profile 400 is retrieved (516) from memory, a comparison (518) is made between identification information included in the profile 400 and that provided by the WLI 113. If the information does not match, a "denied access" message will be presented (519) to the requesting application. If the proper identification and password information is provided, before any location information is identified and retrieved, a query (520) will be made as to whether official authorization for monitoring a particular wireless unit 102 is currently valid. If the official authorization is not valid, the intercept server 200 system will deny (521) the request and log the activity.

A further query (522) is made as to whether the wireless unit of interest 102 is within an area where surreptitious location monitoring is authorized. If the wireless unit of interest 102 is outside an authorized area, the request is denied (523) and the activity is logged in memory. If the wireless unit of interest 102 is within an authorized area, location information privacy settings query for the wireless unit of interest 102 is performed (524) to determine if any privacy settings are active. This may entail the intercept server 200 contacting the HLR of the wireless unit of interest 102. If no privacy settings are active, location information is provided (528) to the LEA in accordance with the triggering events and/or other user specified constraints. If privacy settings are active, an override query 526 is performed to see if the requesting LEA application 114–118 is authorized to override (526) the privacy settings. If not so authorized, the request is denied (527) and the activity is logged in memory. If authorized, location information is provided (528) to the LEA.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. For instance, it may be desirable to monitor more than one wireless unit (e.g., multiple cell phones, pagers etc.) for an individual of interest in this regard, a single profile may allow for entry of multiple mobile unit identifiers. Likewise, functionality may be incorporated that allows entry of the name of a person of interest. In this instance, a search may be performed to identify wireless units (i.e., for subsequent monitoring) believed to be associated with the identified person of interest. Logging functionality may be incorporated into the intercept server 200 as well. In this regard, information for a wireless unit of interest may be monitored over time and stored for later retrieval and analysis. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

The invention claimed is:

1. A method for monitoring a location of a wireless unit of interest across multiple wireless networks, comprising the steps of:

providing a system operative to procure location information for a wireless unit of interest from any of multiple location information sources associated with any of multiple wireless networks;

establishing an interface for communications between said system and an entity requesting location information for said wireless unit of interest, wherein said interface defines a standardized format for requesting and providing said location information;

verifying authorization for said entity to obtain location information for said wireless unit of interest independent of location finding preferences of said wireless unit of interest;

obtaining, from said system, location information for said wireless unit of interest when said wireless unit of interest is within any of multiple location zones covered by at least one of the multiple wireless networks, the obtaining including overriding a privacy setting associated with said wireless unit of interest where necessary to obtain the location information;

analyzing the location information to monitor a location of the wireless unit over time; and providing said monitored location information to a recipient associated with said request, wherein said establishing step allows a requesting entity to define at least one trigger event for triggering the monitoring of the location of the wireless unit of interest, the trigger event including at least one of a schedule, said wireless unit one of sending and receiving wireless communications, and said wireless unit being identified relative to an area of interest, and wherein said establishing step further allows a requesting entity to define at least one said area of interest, when used as a trigger event, including at least one of an address, a point and radius, another wireless unit, and a geographic boundary.

2. The method of claim 1, wherein:
said step of providing a system operative to procure location information for a said wireless unit of interest further comprises procuring location information from at least first and second location information sources, wherein said first and second location information sources employ first and second different location finding technologies.

3. The method of claim 2, wherein said system is operative to aggregate information from said at least first and second different location finding technologies to enhance the accuracy of said location information.

4. The method of claim 1, wherein said verifying authorization step comprises verifying court ordered authorization.

5. The method of claim 1, wherein said step of providing said monitored location information to a recipient further comprises providing said location information to a recipient at a location other than that associated with said requesting entity.

6. The method of claim 1, further comprising:
comparing said location information to at least one location of interest to monitor the movement of said wireless unit relative to said point of interest.

7. The method of claim 6, further comprising:
upon an uncertainty associated with said location information overlapping said at least one location of interest, notifying a third party that said wireless unit is proximate to said at least one location of interest.

8. The method of claim 7, wherein said third party is a law enforcement agency.

9. A method for monitoring a location of a wireless unit of interest across multiple wireless networks, comprising the steps of:
providing a system operative to procure location information for a wireless unit of interest from any of multiple location information sources associated with any of multiple wireless networks;
establishing an interface for communications between said system and an entity requesting location information for said wireless unit of interest, wherein said interface defines a standardized format for requesting and providing said location information;
verifying authorization for said entity to obtain location information for said wireless unit of interest independent of location finding preferences of said wireless unit of interest;
obtaining, from said system, location information for said wireless unit of interest when said wireless unit of interest is within any of multiple location zones covered by at least one of the multiple wireless networks, the obtaining being performed without said wireless unit of interest being notified of said location information being procured;
analyzing the location information to monitor a location of the wireless unit over time; and
providing said monitored location information to a recipient associated with said request,
wherein said establishing step allows a requesting entity to define at least one trigger event for triggering the monitoring of the location of the wireless unit of interest, the trigger event including at least one of a schedule, said wireless unit one of sending and receiving wireless communications, and said wireless unit being identified relative to an area of interest, and
wherein said establishing step further allows a requesting entity to define at least one said area of interest, when used as a trigger event, including at least one of an address, a point and radius, another wireless unit, and a geographic boundary.

10. The method of claim 9, wherein:
said step of providing a system operative to procure location information for a said wireless unit of interest further comprises procuring location information from at least first and second location information sources, wherein said first and second location information sources employ first and second different location finding technologies.

11. The method of claim 10, wherein said system is operative to aggregate information from said at least first and second different location finding technologies to enhance the accuracy of said location information.

12. The method of claim 9, wherein said verifying authorization step comprises verifying court ordered authorization.

13. The method of claim 9, wherein said step of providing said monitored location information to a recipient further comprises providing said location information to a recipient at a location other than that associated with said requesting entity.

14. The method of claim 9, further comprising:
comparing said location information to at least one location of interest to monitor the movement of said wireless unit relative to said point of interest.

15. The method of claim 14, further comprising:
upon an uncertainty associated with said location information overlapping said at least one location of interest, notifying a third party that said wireless unit is proximate to said at least one location of interest.

16. The method of claim 15, wherein said third party is a law enforcement agency.

17. A method for monitoring a location of a wireless unit of interest across multiple wireless networks, comprising the steps of:
providing a system in communication with a first wireless carrier network having a first subscriber set and a second carrier network having a second subscriber set, wherein said system is operative to provide location information for subscribers of either of said carrier networks;
receiving a location information inquiry for a wireless unit of interest, wherein said inquiry requests said location information be provided independent of any location-finding preferences of said wireless unit of interest;
obtaining multiple instances of said location information from said system independent of said location-finding preferences when said wireless unit of interest is within any of multiple location zones covered by at least one of the first and second wireless carrier networks, the obtaining including overriding a privacy setting associated with said wireless unit of interest where necessary to obtain the location information;
analyzing the multiple instances of location information to monitor a location of the wireless unit over time; and
providing said monitored location information to a location associated with said request,
wherein said step of providing a system further allows a requesting entity to define at least one trigger event for triggering the monitoring of the location of the wireless unit of interest, the trigger event including at least one of a schedule, said wireless unit one of sending and receiving wireless communications, and said wireless unit being identified relative to an area of interest, and wherein said step of providing a system further allows a requesting entity to define the at least one said area of interest, when used as a trigger event, including at least one of an address, a point and radius, another wireless unit, and a geographic boundary.

18. The method of claim 17, wherein said obtaining step further comprises obtaining location information for a said wireless unit of interest from at least first and second location information sources, wherein said first and second location information sources employ first and second different location finding technologies.

19. The method of claim 18, wherein said system is operative to aggregate information from said at least first and second different location finding technologies to enhance the accuracy of said location information.

20. The method of claim 17, further comprising:
verifying authorization associated with said inquiry for said entity to obtain said location information for said wireless unit of interest free of any location-finding preferences of said wireless unit of interest.

21. The method of claim 17, further comprising:
establishing an interface for communications between said system and an entity requesting location information for said wireless unit of interest, wherein said interface defines a standardized format for requesting and providing said location information.

22. A method for monitoring a location of a wireless unit of interest across multiple wireless networks, comprising the steps of:
providing a system in communication with a first wireless carrier network having a first subscriber set and a second carrier network having a second subscriber set, wherein said system is operative to provide location information for subscribers of either of said carrier networks;
receiving a location information inquiry for a wireless unit of interest, wherein said inquiry requests said location information be provided independent of any location-finding preferences of said wireless unit of interest;
obtaining multiple instances of said location information from said system independent of said location-finding preferences when said wireless unit of interest is within any of multiple location zones covered by at least one of the first and second wireless carrier networks, the obtaining being performed free of said wireless unit of interest being notified of said location information being procured;
analyzing the multiple instances of location information to monitor a location of the wireless unit over time; and
providing said monitored location information to a location associated with said request,
wherein said step of providing a system further allows a requesting entity to define at least one trigger event for triggering the monitoring of the location of the wireless unit of interest, the trigger event including at least one of a schedule, said wireless unit one of sending and receiving wireless communications, and said wireless unit being identified relative to an area of interest, and
wherein said step of providing a system further allows a requesting entity to define the at least one said area of interest, when used as a trigger event, including at least one of an address, a point and radius, another wireless unit, and a geographic boundary.

23. A method for monitoring a location of a wireless unit of interest across multiple wireless networks, comprising the steps of:
accessing a system operative to provide location information for wireless units from any of multiple location information sources associated with any of multiple wireless networks;
identifying a wireless unit of interest;
analyzing the location information to monitor a location of the wireless unit of interest over time, the monitoring including overriding a privacy setting associated with said wireless unit of interest when necessary to obtain location information;
providing a recipient requesting the location information with an interface for defining at least one trigger event the occurrence of which will result in the provisioning of location information for said wireless unit of interest when said wireless unit of interest is within any of multiple location zones covered by at least one of the multiple wireless networks, the trigger event including at least one of a schedule, said wireless unit sending or receiving wireless communications, and said wireless unit being identified relative to an area of interest, wherein said location information is provided independent of any location-finding preferences of said wireless unit of interest, and wherein the recipient is able to define the area of interest where used for a trigger event to include at least one of an address, a point and radius, another wireless unit, and a geographical boundary; and
providing said monitored location information to the recipient upon the occurrence of said event.

24. The method of claim 23, wherein said accessing step further comprises accessing a system operative to obtain location information for said wireless unit of interest from at least first and second location information sources associated with said multiple wireless networks, wherein said first and second location information sources employ first and second different location finding technologies.

25. The method of claim 23, further comprising:
comparing said location information to at least one location of interest to monitor the movement of said wireless unit relative to said point of interest.

26. The method of claim 25, further comprising:
upon an uncertainty associated with said location information overlapping said at least one location of interest, notifying a party that said wireless unit is proximate to said at least one location of interest.

27. A method for monitoring a location of a wireless unit of interest across multiple wireless networks, comprising the steps of:
accessing a system operative to provide location information for wireless units from any of multiple location information sources associated with any of multiple wireless networks;
identifying a wireless unit of interest;
analyzing the location information to monitor a location of the wireless unit of interest over time, the monitoring being performed free of said wireless unit of interest being notified of said location information being procured;
providing a recipient requesting the location information with an interface for defining at least one trigger event the occurrence of which will result in the provisioning of location information for said wireless unit of interest when said wireless unit of interest is within any of multiple location zones covered by at least one of the multiple wireless networks, the trigger event including at least one of a schedule, said wireless unit sending or receiving wireless communications, and said wireless unit being identified relative to an area of interest, wherein said location information is provided independent of any location-finding preferences of said wireless unit of interest, and wherein the recipient is able to define the area of interest where used for a trigger event to include at least one of an address, a point and radius, another wireless unit, and a geographical boundary; and providing said monitored location information to the recipient upon the occurrence of said event.

* * * * *

UNITED STATES PATENT AND TRADEMARK OFFICE
CERTIFICATE OF CORRECTION

| | | |
|---|---|---|
| PATENT NO. | : 7,231,218 B2 | Page 1 of 1 |
| APPLICATION NO. | : 10/802323 | |
| DATED | : June 12, 2007 | |
| INVENTOR(S) | : Athanassios Diacakis, Ioannis Pavlidis and Paul Joseph Hebert | |

It is certified that error appears in the above-identified patent and that said Letters Patent is hereby corrected as shown below:

On the Title Page, at Item (57), line 5:

"requester" should read

--requestor--

Signed and Sealed this

Eighteenth Day of December, 2007

JON W. DUDAS
*Director of the United States Patent and Trademark Office*